Jan. 7, 1969   J. J. DYMON   3,421,037
ELECTROLUMINESCENT DEVICE AND DIELECTRIC MEDIUM THEREFOR
Filed July 11, 1966
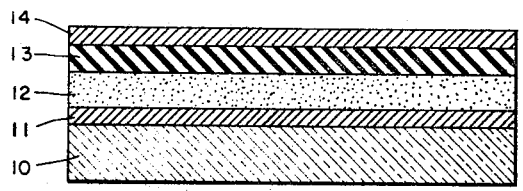
INVENTOR.
JOSEPH J. DYMON
BY R. J. Frank
ATTORNEY.

United States Patent Office 3,421,037
Patented Jan. 7, 1969

3,421,037
ELECTROLUMINESCENT DEVICE AND
DIELECTRIC MEDIUM THEREFOR
Joseph J. Dymon, Flushing, N.Y., assignor to General
Telephone & Electronics Laboratories Incorporated, a
corporation of Delaware
Filed July 11, 1966, Ser. No. 564,175
U.S. Cl. 313—108                                    7 Claims
Int. Cl. H01b 3/42; F21k 2/00; C09k 1/00

ABSTRACT OF THE DISCLOSURE

A dielectric medium for use as a phosphor embedment in electroluminescent lamps consisting of a mixture of cyanoethylcellulose and poly-2,2,2,trifluoroethyl vinyl ether dissolved in a solvent system consisting of acetone, dimethylformamide and tetrahydrofuran. Electroluminescent lamps employing this dielectric medium exhibit excellent adhesion to conductive glass surfaces as well as good brightness and long lamp life.

---

This invention relates to electroluminescent devices and in particular to a dielectric medium suitable for use as a phosphor embedment in electroluminescent lamps.

Electroluminescent lamps generally comprises a pair of electrically conductive electrodes having a layer containing an electroluminescent phosphor embedded in a suitable matrix interposed therebetween. When a voltage is applied across the electrodes, the phosphor emits visible light. One or both electrodes are usually transparent to permit light emitted by the electroluminescent layer to be transmitted therethrough.

One important requirement of a matrix to be used as the phosphor embedment in an electroluminescent lamp is that it have a high dielectric constant. One of the best materials, in this regard, is cyanoethylcellulose (hereinafter sometimes referred to as CEC) which has a dielectric constant on the order of 15 to 20 and a relatively low dissipation factor. CEC, when combined with a suitable electroluminescent phosphor, results in lamps having good brightness and life characteristics. However, commercially available supplies of CEC have been found to vary widely, not only in composition, but also in adhesion capability ranging from no adhesion to moderate adhesion on conductive glass surfaces.

The composition variations are reflected in the degree of substitution of cyanoethyl radicals in an anhydroglucose unit of the cellulose polymer. If the degree of substitution of the commercially obtained CEC should be too low or should vary within a given batch, it becomes extremely difficult to obtain lamps having uniformly satisfactory characteristics.

The lack of satisfactory adhesion of CEC embedments to conductive glass coatings presents additional difficulties. Attempts have been made to promote adhesion to the conductive glass by the addition of large amounts of electrically active and migratory plasticizers such as cresyl diphenyl phosphate, diethylene glycol dibenzoate and butyl cyclohexyl phthalate. While these plasticizers are effective in promoting adhesion, they also adversely affect the brightness and life of the electroluminescent lamp structure.

Accordingly, it is an object of my invention to provide a dielectric medium for electroluminescent lamps which possess improved adhesion without loss of brightness or decrease in the length of time the lamp will operate without undue degradation in performance.

Another object is to provide an improved embedment resin system having good adhesion to glass surfaces and a high dielectric constant.

Still another object is to provide electroluminescent lamps containing a phosphor embedment which results in good brightness and long lamp life as well as excellent adhesion to the conductive glass surface.

Yet another object is to provide an embedment resin system employing CEC as one of the constituents wherein the degree of substitution of the CEC is not critical.

In accordance with my invention, a dielectric medium for dispersing electroluminescent phosphor is provided which comprises a mixture of cyanoethylated cellulose (CEC) and poly-2,2,2,trifluoroethyl vinyl ether (hereinafter sometimes referred to as TFEVE). TFEVE is a soft, resinous, highly deformable material having a dielectric constant of between 15 and 20. If used alone as an embedment for an electroluminescent phosphor it forms a mechanically unstable layer which is quite soft at temperatures as low as 50° C.

When CEC and TFEVE are combined with an electroluminescent phosphor in accordance with my invention, lamps are obtained which have substantially the same brightness and life characteristics as are obtained when CEC is employed alone as the embedment. Further, the new embedment is mechanically stable, hard and has excellent adherence to conductive glass. It has a relatively high temperature capability being able to withstand temperatures as high as 120° C. without softening or decomposing. The characteristics are relatively independent of the degree of substitution of the CEC.

An electroluminescent layer is formed by mixing CEC with TFEVE and dissolving the mixed resins in a suitable solvent system such as a solution of acetone, dimethylformamide and tetrahydrofuran. A phosphor, such as copper-activated zinc sulfide is then mixed with the combined CEC and TFEVE resins in solution and deposited on the surface of a conductive glass. After drying, a conductive layer is deposited over the electroluminescent layer. It shall be understood that other suitable electroluminescent phosphors and solvents may be used in conjunction with the CEC and TFEVE resins if desired.

The above objects of and the brief introduction to the present invention will be more fully understood and further objects and advantages will become apparent from a study of the following description in connection with the accompanying figure which is a schematic cross-section of a typical electroluminescent lamp.

As shown in the figure, the lamp comprises a glass layer 10 having a conventional transparent conductive surface layer 11 deposited thereon. An electroluminescent layer 12 comprising an electroluminescent phosphor embedded in a mixture of cyanoethylcellulose (CEC) and poly-2,2,2,trifluoroethyl vinyl ether (TFEVE) is deposited on the conductive layer 11. A dielectric layer 13 is affixed to the electroluminescent layer 12 although this layer is optional. A second conducting layer 14 is secured to the dielectric layer 13, or to the electroluminescent layer 12 if the dielectric layer is omitted.

Conductive layer 11 may be composed of tin oxide in a mixed valence state of SnO and $SnO_2$. It is formed on glass layer 10 by applying an aqueous solution of the chloride to the surface of layer 10 at elevated temperatures to form a conductive oxide layer.

The phosphors embedded in the mixture of CEC and TFEVE to form layer 12 have the property that they will luminesce under the influence of an electric field. Any electroluminescent phosphor known in the art such as a zinc sulfide activated by copper or manganese and co-activated with chlorine may be employed. Many other electroluminescent phosphors known to those skilled in the art may be used.

The proportions of CEC, TFEVE and phosphor which may be used to form layer 12 vary over a relatively wide range. From 1 to 2 parts by volume of CEC may be mixed with from 2 to 1 parts by volume of TFEVE in a solvent system consisting of approximately equal volumes of acetone, dimethyl formamide and tetrahydrofuran. Other suitable solvents may also be used. Between 0.8 and 1.2 parts by volume of the electroluminescent phosphor is mixed with from 1.2 to 0.8 parts by volume of the resins in solution. The degree of substitution of cyanoethyl radicals in an anhydroglucose unit of the cellulose polymer of the CEC is preferably in the range 2.3 to 2.8, a value of 2.4 being optimum. In general, the higher the degree of substitution, the more TFEVE is needed to provide good adhesion of the resin to the conductive glass.

The dielectric layer 13 increases the brightness of the lamp but may, if desired, be omitted. This layer is formed by spraying a suspension consisting of barium titanate ($BaTiO_3$), CEC and TFEVE in a solution of acetone, dimethylformamide and tetrahydrofuran on the electroluminescent layer.

The conducting layer 14 may consist of a layer of any conducting metal such as aluminum, copper or silver.

An electroluminescent lamp embodying my invention may be fabricated in accordance with the following detailed example in which all parts are given by weight.

2.0 parts of cyanoethylcellulose (CEC) having a degree of substitution of approximately 2.45 obtained commercially from American Cyanamid Co. was mixed with 1.0 part poly-2,2,2,trifluoroethyl vinyl ether (TFEVE) obtained from Air Reduction Co. Inc. The mixed resins were dissolved in a solvent system consisting of 40 parts acetone, 40 parts dimethylformamide and 40 parts tetrahydrofuran. 12 parts of an electroluminescent phosphor composed of zinc sulfide activated with about 0.06 mol percent copper and coactivated with chlorine was mixed with the resin solution.

The mixture was then sprayed over a conductive layer of tin oxide which had been deposited on the surface of a glass plate. (The tin oxide was applied to the sprayed surface by the method previously described. The glass may also be purchased commercially as NESA Conductive Glass with the tin oxide layer already affixed.)

The electroluminescent layer is next air-dried at a temperature of about 120° C. for one hour followed by drying at the same temperature for one-half hour in a vacuum of less than one micron.

The dielectric layer 13 is formulated by preparing a solution of 6 parts premilled chemically pure $BaTiO_3$, 1.5 parts CEC, 1.5 parts TFEVE in 35 parts acetone, 35 parts dimethylformamide and 35 parts tetrahydrofuran and spraying it on the electroluminescent layer 12. The dielectric layer is then air-dried at 120° C. for about one hour followed by a vacuum drying at less than 1 micron pressure for a half hour at 120° C. as in the case of the electroluminescent layer.

After the dielectric layer is dried, an aluminum electrode 14 is evaporated on the dielectric layer 13. The lamp is then encapsulated by hermetically sealing in vacuum or alternatively by epoxy encapsulation. A number of electroluminescent lamps prepared by the described method were tested for brightness and lifetime at various voltages. The thickness of the electroluminescent layers in these lamps was 2.4±0.1 mils and the thickness of the dielectric layers was 0.8±0.1 mil. The electroluminescent layers on all lamps exhibited excellent adhesion to the conductive glass coating.

The lamps were tested by applying alternating voltages of 115 and 150 volts at frequencies of 400 cycles per second across electrodes 11 and 14. With 115 volts, 400 c.p.s. excitation, the brightness of a green emitting phosphor was approximately 15 footlamberts with a half life of 1200 to 2000 hours. At 150 volts, 400 c.p.s. excitation, 23 footlamberts with a half life of 1200 to 1800 hours was obtained.

Summarizing, this invention provides an electroluminescent lamp having good brightness and long life together with excellent adhesion of the electroluminescent layer to conductive glass surfaces. In addition, the characteristics of the electroluminescent layer are essentially independent of the variations normally found in the degree of substitution of commercially obtainable cyanoethylcellulose. These advantages are obtained by the use of an embedment comprising a mixture of cyanoethylcellulose and poly-2,2,2,trifluoroethyl vinyl ether.

As many changes and modifications could be made in the above composition and many different materials could be used without departing from the scope thereof, it is intended that all matter contained in the above description or shown in the accompanying figure shall be interpreted as illustrative and not in a limiting sense.

What is claimed is:

1. A dielectric medium for dispersing electroluminescent phosphors comprising a mixture of one to two parts by volume of cyanoethylcellulose and two to one parts by volume of poly-2,2,2,trifluoroethyl vinyl ether.

2. A dielectric medium as defined by claim 1, wherein the degree of substitution of cyanoethyl radicals in each anhydroglucose unit of the cellulose polymer in said cyanoethylcellulose is between 2.3 and 2.8.

3. A dielectric medium as defined by claim 1, wherein said mixture of cyanoethylcellulose and poly-2,2,2,trifluoroethyl vinyl ether is dissolved in a solvent system consisting of acetone, dimethylformamide and tetrahydrofuran.

4. An electroluminescent layer comprising an electroluminescent phosphor dispersed in a mixture of one to two parts by volume of cyanoethylcellulose and two to one parts by volume of poly-2,2,2,trifluoroethyl vinyl ether.

5. The electroluminescent layer defined by claim 4, wherein said layer consists from 0.8 to 1.2 parts by volume of electroluminescent phosphor and from 1.2 to 0.8 parts by volume of said mixture of cyanoethylcellulose and poly-2,2,2,trifluoroethyl vinyl ether.

6. An electroluminescent device comprising a first electrode, a second electrode and a layer of light-emitting material interposed between said first and second electrodes, said light-emitting material comprising an electroluminescent phosphor embedded in a mixture of one to two parts by volume of cyanoethylcellulose and two to one parts by volume of poly-2,2,2,trifluoroethyl vinyl ether.

7. An electroluminescent device as defined by claim 6, wherein a dielectric layer is interposed between said second electrode and said layer of light-emitting material, said dielectric layer comprising a mixture of barium titanate, cyanoethylcellulose and poly-2,2,2,trifluoroethyl vinyl ether.

References Cited

UNITED STATES PATENTS

| | | | |
|---|---|---|---|
| 3,067,141 | 12/1962 | Bikales et al. | 252—301.3 |
| 3,096,289 | 7/1963 | D'Errico et al. | 252—301.3 |
| 3,248,588 | 4/1966 | Blazek et al. | 252—301.3 |

TOBIAS E. LEVOW, *Primary Examiner.*

J. COOPER, *Assistant Examiner.*

U.S. Cl. X.R.

252—65, 66, 301.3; 260—884, 900